Patented Nov. 8, 1949

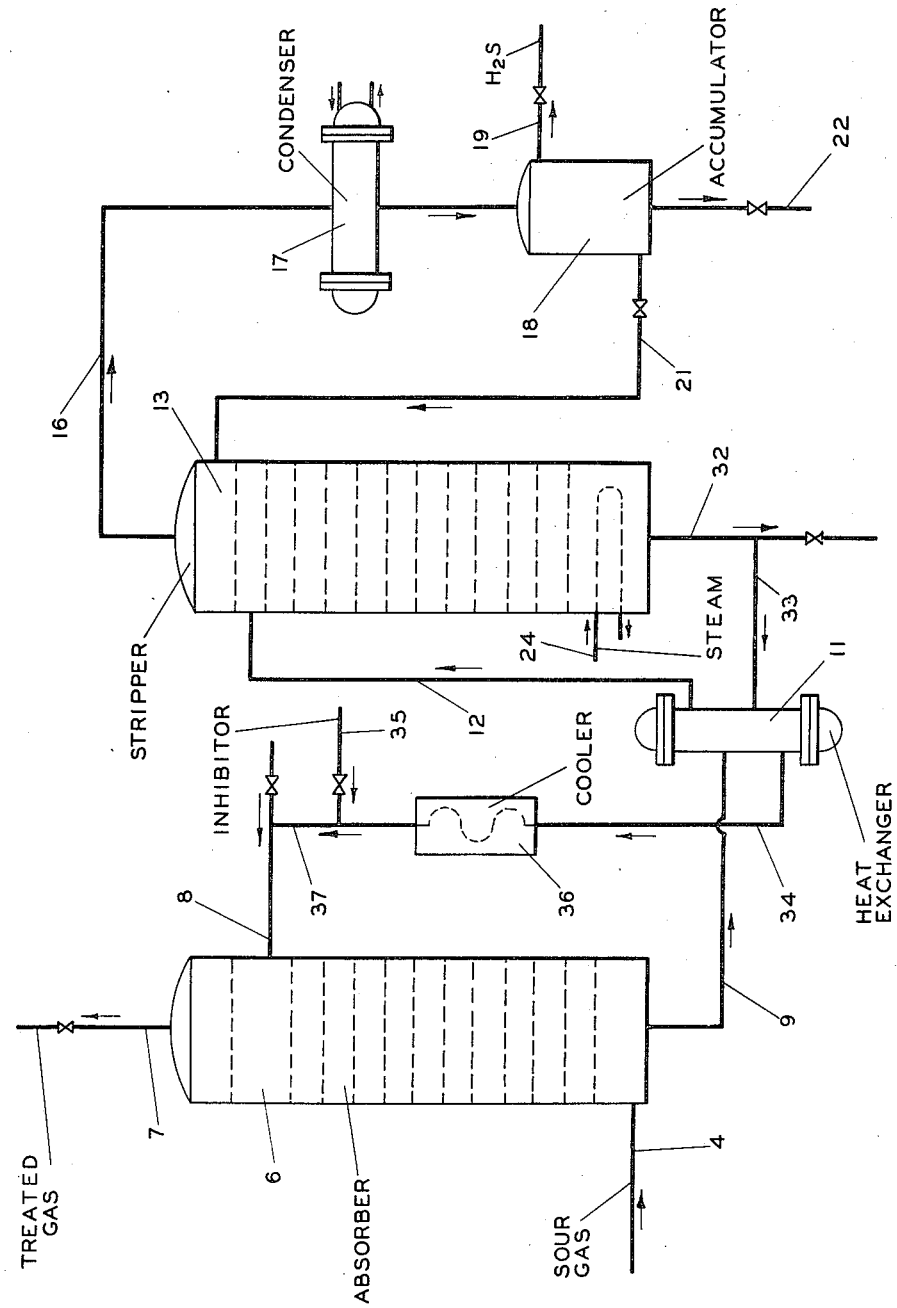

2,487,578

UNITED STATES PATENT OFFICE 2,487,578

PREVENTION OF CORROSION OF METALLIC SURFACES

Charles O. Meyers, Bartlesville, Okla., assignor to Phillips Petroleum Company, a corporation of Delaware Application May 7, 1946, Serial No. 667,871

5 Claims. (Cl. 23—3)

This invention relates to the treatment of fluids containing acidic materials. In one aspect this invention relates to the prevention of corrosion of metallic surfaces by aqueous solutions. In another aspect this invention relates to the removal of acidic material, such as hydrogen sulfide, from gases. In another more specific aspect, this invention relates to the control of the corrosiveness of an aqueous absorption solution used for recovering acidic materials from fluid.

Many gases used commercially for various purposes contain acidic materials which are detrimental to the use of these gases. Particularly, normally gaseous mixtures containing hydrocarbons, for example, natural gas and light gases obtained from various hydrocarbon conversion processes, are used as fuel, as feed to hydrocarbon conversion processes, and in the production of carbon black. Acidic impurities, such as hydrogen sulfide, sulfur dioxide and carbon dioxide, contained in these gases often interfere with chemical reactions in which the gases are involved as well as being injurious to equipment which the gases contact. The detrimental effect of the acidic materials necessitates their removal from the gases. These acidic materials may be removed and recovered from the gases as valuable products, especially hydrogen sulfide which may be used to produce sulfuric acid, and carbon dioxide which may be used in the manufacture of carbon monoxide. From an olfactory aspect it is also desirable in many cases to remove acidic material from gases vented to the atmosphere, such as flue gases and waste refinery gases.

Generally, fluids containing these impurities are treated by contacting the fluid, either in the liquid or vapor phase, with a suitable aqueous absorption medium capable of removing the undesirable impurities. In particular, the absorption medium comprises aqueous solution of a water soluble amine, such as amino alcohols, preferably the ethanol amines, such as monoethanolamine, diethanolamine, triethanolamine and diethanolamine-diethylene glycol, or mixtures of these amines. The fluid containing the acidic impurities is passed into the lower portion of an absorption column to contact a down flowing liquid absorption medium. A treated fluid is removed from the upper portion of the column and is substantially free from the acidic impurities. The absorption medium is passed from the absorption column to a stripping or a reactivation zone for the removal of acidic impurities from the absorption medium. The reactivated absorption medium is then recycled to the absorption column.

Such aqueous absorption mediums often become very corrosive to the metallic surfaces which they contact. For example, a monoethanolamine solution is susceptible to oxidation under certain conditions, and the monoethanolamine may be converted to aminoacetic acid as shown by the following reaction:

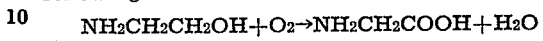

$NH_2CH_2CH_2OH + O_2 \rightarrow NH_2CH_2COOH + H_2O$

Aminoacetic acid is corrosive toward metal surfaces especially ferrous metal surfaces when present in the monoethanolamine solution containing carbon dioxide and hydrogen sulfide. Consequently, amine solutions may become corrosive as a result of oxidation occurring when the solutions contact gases containing oxygen as in some cases. Such corrosion of metallic equipment may occur to a highly undesirable extent when a sufficient quantity of aminoacetic acid or other by-products have accumulated in the amine solution.

An aqueous amine solution which has become corrosive after being used for removing carbon dioxide and hydrogen sulfide from gases will dissolve iron from the equipment upon being heated when it is saturated with carbon dioxide. The dissolved iron will be precipitated from the solution when it is boiled or stripped during reactivation, so that the carbon dioxide is released from it, and the solution will dissolve more iron when it again is heated after being resaturated with carbon dioxide. By this cyclic action a rapid corrosion of equipment may occur. It is much to be desired therefore to inhibit the aqueous absorption medium in such a manner as to prevent the corrosion of metallic surfaces thereby.

The removal of acidic materials from fluids in the above described manner is used at some points in production of such materials as toluene, synthetic ammonia, synthetic rubber, sulfuric acid, aviation gasoline, ammonium nitrate, hydrogen, carbon monoxide, fuel gas, and light weight metals.

The object of this invention is to prevent the corrosion of metallic surfaces by aqueous amine solutions in the presence of hydrogen sulfide.

Another object of this invention is to remove acidic materials from fluids containing the same.

Still another object of this invention is to remove hydrogen sulfide and carbon dioxide from low-boiling hydrocarbon mixtures containing the same.

It is also another object of this invention to provide a corrosion inhibitor for aqueous solutions.

Another object is to prevent the corrosion of metallic surfaces.

It is still a further object of this invention to provide an improvement in the operation of the absorption-stripping cycle of an absorption process for the removal of acidic material from fluids containing the same.

Further objects and advantages of the present invention will become apparent to those skilled in the art from the following description and disclosure.

According to this invention an aqueous solution which tends to have become corrosive toward metallic surfaces, such as iron, is prevented from corroding such metallic surfaces by incorporating in said solution a glucoside, in particular a chrom glucosate, such as the following:

Acid chrom glucosate

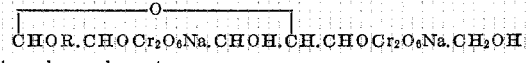

Sodium chrom glucosate

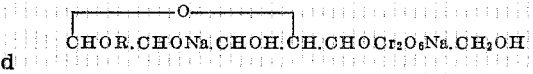

and

Quachrom glucosate

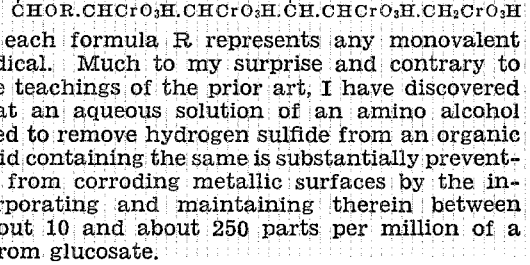

in each formula R represents any monovalent radical. Much to my surprise and contrary to the teachings of the prior art, I have discovered that an aqueous solution of an amino alcohol used to remove hydrogen sulfide from an organic fluid containing the same is substantially prevented from corroding metallic surfaces by the incorporating and maintaining therein between about 10 and about 250 parts per million of a chrom glucosate.

From literature on inorganic corrosion inhibitors, only chromate compounds, which form a monomolecular film of the hexavalent chromium on the metallic surface, are effective as corrosion inhibitors. The chromic compounds are not inhibitors because they either precipitate or decompose in aqueous solutions. The precipitates, such as chromium hydroxide form at a distance from the metallic surface and thus do not form a protective film on the surface. The same is true of the organic chromium components and, therefore, only the organic chromates, such as a chrom glucosate, are effective as inhibitors. According to the prior art, a chrom glucosate used as an inhibitor to prevent corrosion of metallic surfaces by aqueous solutions should not be used as an inhibitor in the presence of a reducing agent. Supposedly, the chrom glucosate, itself an oxidizing agent, will be reduced by a reducing agent from a hexavalent chromium to a trivalent chromium, and thus the inhibiting power of the chrom glucosate will be destroyed. Since it is presumed that a chrom glucosate forms a monomolecular film of the hexavalent chromium on the metallic surface, a reducing agent, such as hydrogen sulfide, would prevent the formation of such a monomolecular film by reduction of the hexavalent to the trivalent chromium.

Furthermore, it is known that an amine solution is easily oxidized and that the oxidized product of the amine is very corrosive to metallic surfaces. From such knowledge it has been supposed that the use of an oxidizing agent, such as a chrom glucosate, as a corrosion inhibitor would oxidize the amine solution and render the solution extremely corrosive rather than noncorrosive.

Unexpectedly, therefore, it has been found that a chrom glucosate may be used in the presence of a reducing agent, such as hydrogen sulfide, without deleterious effects upon the inhibiting power of the chrom glucosate. Also, quite unexpectedly, the crom glucosate does not render an amine solution corrosive by its presence therein. Nor is any apparent precipitate formed in the solution in either case. No particular reason or theory is as yet known why chrom glusocate is as effective as an inhibiting agent in the presence of hydrogen sulfide as in a situation in which no reducing agent is present. Also, no satisfactory explanation is available as to why the chrom glucosate does not make an amine solution corrosive by its presence therein. Perhaps in either instance it may be the result of the formation of a complex between the hydrogen sulfide or the amine and the chrom glucosate, which complex is in itself an effective corrosion inhibitor.

In any event, I have found according to this invention that a chrom glucosate is a very good corrosion inhibitor in the presence of hydrogen sulfide and/or an amine and apparently a protective film is formed on the metallic surface. I consider as my invention the incorporation of a compound selected from at least one of the groups consisting of a chrom glucosate, a chromium reaction product of chrom glucosate and hydrogen sulfide, and a chromium reaction product of chrom glucosate and a water soluble amine into a system at least potentially corrosive to metallic surfaces, which complex compounds are defined herein broadly as chrom glucosate compounds and which system consists of any one of the following systems: a system comprising water, hydrogen sulfide and a corrodible metallic surface; a system comprising water, a water soluble amine, an active oxygen and a corrodible metallic surface; and a system comprising water, hydrogen sulfide, a water soluble amine, an active oxygen and a corrodible metallic surface.

According to the preferred embodiment of this invention a fluid containing acidic materials is passed to an absorption zone and is contacted with a suitable absorption medium containing an amino alcohol to remove the acidic materials. When operating in the vapor phase, a gaseous stream containing acidic materials is introduced into the lower portion of an absorption column wherein it passes upward countercurrently to a down flowing liquid aqueous solution of an amino alcohol. The liquid aqueous solution is introduced and an effluent is removed from the upper portion of the absorption column. Enriched aqueous absorption medium is removed as a liquid from the lower portion of the absorption column and passes to the upper portion of a stripping or reactivation column. In the stripping column the acidic materials in the absorption medium are desorbed therefrom and are removed as a gaseous effluent from the upper portion of the stripping column. A reactivated liquid aqueous solution of the amino alcohol is withdrawn from the lower portion of the stripping column and recycled (after cooling) to the absorption column.

In the operation of an absorption process as described herein using an amino alcohol solution, such as a monoethanolamine solution or a diethanolamine solution or a solution of both monoethanolamine and diethanolamine, a chrom glucosate, preferably quachrom glucosate, is added, usually to the aqueous solution, to inhibit the corrosiveness of the aqueous solution on metallic surfaces during the absorption process. Quachrom glucosate is added and maintained in the aqueous solution in an amount between about 10 and about 250 parts per million, generally within the range between about 100 and about 125 parts per million. In practice, approximately one half pound of quachrom glucosate per month is added to a treating system which contains approximately 1500 gallons of amine treating solution.

The fluid to be treated in the absorption zone may be either a vapor or a liquid phase. In case the fluid is a liquid, such as a liquid hydrocarbon stream used as a polymerization feed stock, the liquid stream is passed upward to the absorption zone countercurrently to the downward flow of the liquid absorption medium by virtue of the difference in densities of the two streams.

The process for the removal of acidic material from fluids by absorption in an aqueous solution of an amino alcohol is based on a chemical phenomenon that acidic materials, such as hydrogen sulfide, carbon dioxide, react with the amine to form a chemical compound which may be dissociated by heat. For example, typical reactions between a primary amine and hydrogen sulfide are as follows:

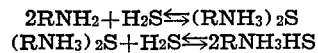

$$2RNH_2 + H_2S \rightleftharpoons (RNH_3)_2S$$
$$(RNH_3)_2S + H_2S \rightleftharpoons 2RNH_3HS$$

These reactions are reversible, the equilibria depending largely upon the concentration of the reactants and the temperature.

The drawing diagrammatically represents an arrangement of apparatus for carrying out the process of this invention to be described more fully hereinafter. In order that this invention may be clearly understood and its applicability realized, a brief description of the process for the removal of hydrogen sulfide from a gaseous hydrocarbon stream by contact with an aqueous solution of an amino alcohol containing quachrom glucosate as an inhibitor will be made. A hydrocarbon stream, such as sour natural gas, containing hydrogen sulfide in an amount between about 2 to about 9000 grains per 100 cubic feet of gas (standard conditions), that is, about 65 to about 290,000 parts per million, is passed to absorber 6 through line 4. The hydrocarbon stream passes upward through baffles, trays, or packing in absorber 6 countercurrently to a down flowing liquid amine solution. A gaseous hydrocarbon stream substantially free from hydrogen sulfide and any other acidic material is removed from absorber 6 through line 7. The hydrogen sulfide of the effluent hydrocarbon stream is below about one and one half grains and may be as low as about 0.02 grain per 100 cubic feet of gas, that is, about 0.65 part per million. The liquid aqueous amine solution is introduced into the upper portion of absorber 6 through line 8. Typical aqueous amine solutions may comprise about 15 to about 50 per cent diethanolamine and, in some instances, also about 25 to about 40 per cent diethylene glycol. The enriched amine solution is removed from absorber 6 and is passed to heat exchanger 11 through line 9 and thence to stripper 13 through line 12.

Suitable temperatures and pressures are maintained in absorber 6 to ensure removal of substantially all of the hydrogen sulfide from the hydrocarbon stream by absorption. The pressure within absorber 6 corresponds generally to the pressure available in the incoming hydrocarbon stream. The temperature is maintained in absorber 6 above the dewpoint of the hydrocarbon stream being treated. In general, the temperature is maintained between about 60 to about 150° F. at an existing pressure between atmospheric and 800 pounds per square inch gage.

Hydrogen sulfide and other acidic materials dissolved in the enriched amine solution are desorbed in stripper 13 by heating. Heat is supplied to stripper 13 by passing steam through heating element 24 located at the bottom of stripper 13. Hydrogen sulfide and water vapor pass overhead from stripper 13 through line 16 and thence through condenser 17 to accumulator 18. Water vapor is condensed in condenser 17 and the resulting condensate is collected in the lower portion of accumulator 18. Hydrogen sulfide and other gases are vented from the system through line 19. A portion or all of the condensate in accumulator 18 is passed through line 21 to the upper portion of stripper 13 as a liquid reflux therefor and as make-up water for the system. Liquid amine solution, substantially free from hydrogen sulfide, accumulates in the lower portion of stripper 13. The reactivated amine solution is withdrawn from stripper 13 through line 32 and may be recycled directly to absorber 6 through line 33, heat exchanger 11, line 34, cooler 36, line 37 and line 8.

Generally, a temperature between about 200 and about 300° F. and a pressure between about atmospheric and about 30 pounds per square inch gage are maintained on stripper 13. Stripper 13 contains conventional bubble trays, baffles or packing to ensure effective removal of acidic material from the amine absorption liquid.

Make-up absorption liquid or make-up water may be added to the system through line 8 when necessary. Unrecycled condensate is discharged through line 22.

The chrom glucosate, in particular quachrom glucosate, is generally added to the system through line 35 in the appropriate quantities either intermittently or continuously. Quachrom glucosate is a dark brown, viscous liquid, soluble in water and insoluble in organic solvents. It has a pH of about 2.85 and is considered an oxidizing agent. In operation it forms a monomolecular film on metallic surfaces, such as iron and other metals above chromium in the electrochemical series. This monomolecular film of quachrom glucosate on the metallic surface prevents corrosion. For optimum operation and maximum corrosion inhibiting effect, the quachrom glucosate content of the aqueous solution of the amino alcohol should be maintained between about 100 to about 125 parts per million. Quachrom glucosate may be used in the presence of hydrogen sulfide and/or an amine to prevent corrosion of metallic surfaces by an aqueous solution.

The following examples are presented as illustrations of the applicability of the present process and should not be considered to unduly limit the invention.

EXAMPLE I

A gas treating system similar to the process described in the drawing was placed in operation and within nine months after use approximately 30 of the 137 tubes making up the reactivation heating element in the stripper, such as element 24 in the drawing, had been plugged and were thus out of service because of surface corrosion. An analysis of the diethanolamine treating solution in use after about eight months of service was approximately as follows:

Table I

| | | |
|---|---|---|
| Diethanolamine | per cent by weight | 34 |
| Monoethanolamine | do | 2.1 |
| Thiosulphate | | None |
| Dissolved iron | parts per million | 100 |
| Iron capacity | do | 200 |

EXAMPLE II

In a second run using fresh equipment and a fresh absorption solution of diethanolamine to which a small amount of quachrom glucosate was added during the treatment (about one half pound per month per 1500 gallons of solution), the gas treatment was repeated. After several years of service, the heating element tubes in the stripper were not affected by corrosion during continuous service. The analysis of the treating solution after several years of operation of the process was as follows:

Table II

| | | |
|---|---|---|
| Diethanolamine | per cent by weight | 25 |
| Monoethanolamine | do | 0.6 |
| Sodium thiosulphate | grains per gallon | 2.6 |
| Iron content | parts per million | 10 |
| Iron capacity | do | 620 |

Comparison of the analysis of the absorption medium in the two runs above described reveals that the iron content of the treating solution in Example I during severe corrosion is approximately ten times the iron content of that solution of Example II when no corrosion was evidenced. The iron content of a solution is a result of the iron in solution and therefore is a measure of the active corrosiveness. On the other hand, the iron capacity of the solution in Example II is approximately three times that amount in the solution of Example I. This iron capacity is a measure of the iron in a solution after a sample of the solution has been under extended intimate contact with iron filings at elevated temperatures and at high carbon dioxide partial pressure. The higher the iron capacity, the higher the potential corrosiveness of the solution. Thus, it may be concluded that the treating solution in service in Example II shows a moderately high potential corrosiveness yet the actual amount of corrosiveness shown by the iron picked up in the solution is almost negligible. This effect is attributed to the action of the quachrom glucosate inhibitor in the presence of hydrogen sulfide and the amine solution. This result can be considered unexpected since the manufacturer of this inhibitor specifically states that it should not be used with a reducing agent and that the inhibitor itself is an oxidizing agent.

For convenience and clarity certain apparatus, such as pumps, surge tanks, accumulators, valves, etc. have not been shown in the drawing. Obviously, such modifications of the present invention may be practiced without departing from the scope of the invention. Broadly, this invention comprises a method for preventing the corrosion of metallic surfaces by an aqueous solution in the presence of either hydrogen sulfide or an amine, or both, by incorporating in such a system a chrom glucosate.

I claim:

1. In a process for the removal of acidic material including hydrogen sulfide from an hydrocarbon fluid mixture by contacting said mixture containing said hydrogen sulfide in an amount between 65 and 290,000 parts per million with an aqueous solution of a water soluble organic amine in an absorption system in which said amine becomes oxidized and thereby corrosive, the method of preventing corrosion of metallic surfaces with which said amine solution makes contact, which comprises adding to said aqueous amine solution and maintaining therein between 10 and 250 parts per million of a chrom glucosate.

2. A process according to claim 1 in which said amine is diethanolamine.

3. A process according to claim 1 in which said chrom glucosate is quachrom glucosate.

4. A process according to claim 1 in which said chrom glucosate is acid chrom glucosate.

5. In a process for the removal of acidic material including hydrogen sulfide in an amount between 65 and 290,000 parts per million from a hydrocarbon fluid mixture containing the same by passing such a fluid mixture into the lower portion of an absorption zone, passing into the upper portion of said absorption zone an aqueous solution of a water soluble amine solution which becomes oxidized and thereby corrosive, removing a fluid effluent substantially free from acidic material from the upper portion of said absorption zone, removing an enriched liquid amine solution containing acidic material from the lower portion of said absorption zone, passing said enriched liquid amine solution to a stripping zone, heating the lower portion of said stripping zone, removing a gaseous mixture containing free acidic material from the upper portion of said stripping zone, withdrawing a liquid aqueous amine solution substantially free from acidic material from the lower portion of said stripping zone and passing the same to said absorption zone, the method for preventing corrosion of metallic surfaces which are contacted by said aqueous amine solution, particularly the surfaces in said stripping zone, which normally become corroded during said process, which comprises incorporating in said aqueous amine solution a chrom glucosate and maintaining the content of said chrom glucosate in said aqueous solution between 10 and 250 parts per million.

CHARLES O. MEYERS.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 2,289,006 | George | July 7, 1942 |

OTHER REFERENCES

Hearing, "Film Inhibitors in Industrial Aqueous Systems," in Industrial & Engineering Chemistry, vol. 30, No. 12, Dec. 1938, pp. 1356–1361.